US009608530B2

(12) United States Patent
Mueller et al.

(10) Patent No.: US 9,608,530 B2
(45) Date of Patent: Mar. 28, 2017

(54) CIRCUIT CONFIGURATION HAVING A RESONANT CONVERTER, AND METHOD FOR OPERATING A RESONANT CONVERTER

(71) Applicant: SIEMENS AKTIENGESELLSCHAFT, Munich (DE)

(72) Inventors: Glenn Mueller, Chemnitz (DE); Stephan Rupf, Claussnitz (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 324 days.

(21) Appl. No.: 14/265,565

(22) Filed: Apr. 30, 2014

(65) Prior Publication Data
US 2014/0321169 A1    Oct. 30, 2014

(30) Foreign Application Priority Data
Apr. 30, 2013    (DE) .................. 10 2013 207 883

(51) Int. Cl.
*H02M 3/335*    (2006.01)
*B60L 11/18*    (2006.01)
(Continued)

(52) U.S. Cl.
CPC ....... *H02M 3/33515* (2013.01); *B60L 3/0023* (2013.01); *B60L 3/0069* (2013.01);
(Continued)

(58) Field of Classification Search
CPC ................................. H02M 3/33515
(Continued)

(56) References Cited

U.S. PATENT DOCUMENTS 2,783,384 A    2/1957   Bright et al.
5,315,496 A *  5/1994   Okochi ............. H02M 3/33507
                                              363/21.02
(Continued)

FOREIGN PATENT DOCUMENTS

DE    102008027126 A1    12/2009
DE    102012007449 A1    10/2013
(Continued)

OTHER PUBLICATIONS

International Rectifier: Preliminary Data Sheet No. PD601169-E IR2159(S) IR21591(S) Dimming Ballast Control IC Aug. 10, 2001., www.irf.com [downloaded Apr. 25, 2014].

*Primary Examiner* — Samuel Berhanu
*Assistant Examiner* — Tessema Kebede
(74) *Attorney, Agent, or Firm* — Laurence Greenberg; Werner Stemer; Ralph Locher (57) ABSTRACT

A circuit configuration contains a resonant converter feeding energy into a primary winding of a transformer, a control circuit for controlling the resonant converter and a plurality of modules. The modules include a frequency generator controllable with variable frequency, a short circuit monitoring unit configured to protect components of the resonant converter, and an open circuit detection unit. The open circuit detection unit is configured to shut down the resonant converter if a secondary side interacting with the primary winding of the transformer is open circuit, without having information from the secondary side.

16 Claims, 6 Drawing Sheets

(51) Int. Cl.
*H02J 7/02* (2016.01)
*B60L 3/00* (2006.01)
*B60L 3/04* (2006.01)
*H02J 5/00* (2016.01)
*H02J 17/00* (2006.01)

(52) U.S. Cl.
CPC ............... *B60L 3/04* (2013.01); *B60L 11/182* (2013.01); *B60L 11/1805* (2013.01); *B60L 11/1812* (2013.01); *B60L 11/1846* (2013.01); *B60L 11/1861* (2013.01); *H02J 5/005* (2013.01); *H02J 7/025* (2013.01); *H02J 17/00* (2013.01); *B60L 2210/40* (2013.01); *B60L 2240/526* (2013.01); *B60L 2240/527* (2013.01); *B60L 2240/529* (2013.01); *B60L 2270/147* (2013.01); *Y02T 10/705* (2013.01); *Y02T 10/7005* (2013.01); *Y02T 10/7044* (2013.01); *Y02T 10/7072* (2013.01); *Y02T 10/7241* (2013.01); *Y02T 90/121* (2013.01); *Y02T 90/122* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
USPC ...................................................... 363/21.02
See application file for complete search history.

(56) References Cited

U.S. PATENT DOCUMENTS

| | | |
|---|---|---|
| 5,594,318 A | 1/1997 | Nor et al. |
| 5,760,491 A | 6/1998 | Kalin |
| 6,118,249 A | 9/2000 | Brockmann et al. |
| 2003/0147263 A1 | 8/2003 | Ribarich |
| 2007/0121349 A1* | 5/2007 | Mednik ............ H02M 3/33523 363/21.01 |
| 2007/0133236 A1* | 6/2007 | Usui ...................... H02M 1/32 363/56.01 |
| 2008/0197712 A1* | 8/2008 | Jin ......................... H02J 5/005 307/104 |
| 2009/0174264 A1* | 7/2009 | Onishi ................... H02J 5/005 307/104 |
| 2011/0074346 A1 | 3/2011 | Hall et al. |
| 2012/0161696 A1* | 6/2012 | Cook .................... B60L 11/182 320/108 |
| 2013/0223107 A1* | 8/2013 | Zhang ............... H02M 3/33523 363/21.16 |

FOREIGN PATENT DOCUMENTS

| | | |
|---|---|---|
| EP | 0758153 A2 | 2/1997 |
| EP | 0820653 B1 | 6/1999 |
| EP | 0982831 A2 | 3/2000 |
| EP | 1432097 A1 | 6/2004 |
| EP | 1962403 A2 | 8/2008 |
| EP | 2079144 A2 | 7/2009 |
| JP | 2006230032 A | 8/2006 |
| WO | 9428560 A1 | 12/1994 |
| WO | 2012058466 A1 | 5/2012 |

* cited by examiner

CIRCUIT CONFIGURATION HAVING A RESONANT CONVERTER, AND METHOD FOR OPERATING A RESONANT CONVERTER

CROSS-REFERENCE TO RELATED APPLICATION

This application claims the priority, under 35 U.S.C. §119, of German application DE 10 2013 207 883.8, filed Apr. 30, 2013; the prior application is herewith incorporated by reference in its entirety.

BACKGROUND OF THE INVENTION

Field of the Invention

The invention relates to a circuit configuration having a resonant converter, in particular for wirelessly charging an electric vehicle, and to a method for operating a resonant converter.

A resonant converter is a DC converter which employs a resonant circuit and converts a DC voltage into a single-phase or polyphase AC voltage. In so far as no rectification takes place at the output of the resonant converter, it is also termed an inverter.

Simple inverter designs employing a pair of transistors as switching elements in each case are known from U.S. Pat. No. 2,783,384, for example.

Published, non-prosecuted German patent application DE 10 2008 027 126 A1 discloses a method for operating a resonant circuit having at least two electronic switches. The resonant circuit which is formed within a resonant converter is configured to be shut down if, during or after tripping of one of the switches, a current through the switch reaches or falls below a predefined threshold value. The resonant converter is used for energy transfer, by a transformer, between a power circuit and a load circuit electrically isolated there from, wherein the power circuit and load circuit can be part of a domestic appliance system. In DE 10 2008 027 126 A1 a coffee machine is cited as an example.

European patent EP 0 820 653 B1, corresponding to U.S. Pat. No. 5,594,318, discloses a traction battery charging system using inductive coupling. Here charging energy is transferred from a charging station to an electric vehicle as alternating current in the 10 to 200 kHz range and rectified in the electric vehicle. The traction battery charging system is configured to be suitable in particular for vehicles that are equipped with a battery energy management system (BEMS). An on-board, battery-specific charging control module provided in the electric vehicle makes decisions and sends signals in respect of the magnitude and timing of the charging current to the charging station. In European patent EP 0 820 653 B1, the charging station is termed universal in the sense that it is configured for the connection of a wide variety of electric vehicles.

SUMMARY OF THE INVENTION

The object of the invention is to make a resonant converter which is suitable for use in a wireless battery charging system, in particular for electric vehicles, particularly resistant to possible disturbances during the charging process.

The object is achieved according to the invention by a circuit configuration containing a resonant converter and a method for operating the resonant converter. In the description which follows, embodiments and advantages explained in connection with the circuit configuration also apply analogously to the method and vice versa.

The circuit configuration contains a resonant converter which feeds energy into a primary winding of a transformer, and a control circuit provided for the controlling thereof and containing a plurality of modules. The modules include a frequency generator controllable with variable frequency, a short circuit monitoring unit for protecting components of the resonant converter and also preferably incorporating a resonance error monitoring unit, in particular for detecting an under-resonance, and an open circuit detection unit which is configured to shut down the resonant converter if no load is present on a secondary side interacting with the primary winding of the transformer, without feedback from the secondary side. In a preferred embodiment, the secondary side is not mechanically connected to the primary winding.

The invention is based on the insight that, during wireless charging of a battery, parameters relevant to the charging process may change in an unintended manner. This applies, for example, if the position of the battery under charge is rapidly changed relative to the charging station or if material is introduced into a gap between the charging station and the object in which the battery under charge is located.

Ideal charging station operation in which the battery under charge and a secondary winding disposed in the same object are in a precisely determined geometric relationship to the primary, i.e. charging-station-side winding, can therefore only be ensured in practice, particularly for charging electric vehicles, if special protective measures are taken. Such protection could be provided, for example, in the form of fixing mechanisms which keep the primary and secondary side of the transformer used for the charging process in an unchanged position relative to one another.

Another approach for preventing deviations from the as-intended charging process or at least detecting them in good time in order to be able to initiate measures to prevent impermissible operating states, is to permanently monitor the secondary-side operating parameters. In the case of wireless charging, a radio link could be set up for this purpose between the secondary side and the primary side of the entire configuration containing the transformer and a resonant converter supplying the latter with energy. Such a radio link could be produced economically using components widely used in mobile communications technology.

Another possibility for providing overload protection, particularly in the event of open circuit operation, for secondary components of the charging device using the transformer for energy transfer, i.e. the inductive charging device, is basically to provide a permanent secondary load in addition to the battery to be charged. Also in the case of this conceivable protective measure, any secondary-side operating disturbances during charging can therefore be counteracted using likewise secondary-side protection devices.

By contrast, the invention provides primary-side monitoring of the charging process, relating to both short circuit monitoring and open circuit monitoring.

In the simplest case, short-circuit monitoring is configured to shut down the resonant converter in the event of a short circuit in the narrowest sense. In more complex, preferred embodiments, the short circuit monitoring unit contains a plurality of modules reacting with different speeds to current changes and preferably acting independently of one another as protection devices. In particular, in addition to a very fast-acting short circuit monitoring unit, a resonance error monitoring unit that is comparatively slow-acting, but reacts to smaller current changes is present which detects error states of the resonant converter and shuts it down if necessary. The monitoring unit is therefore implemented in particular as a short circuit and resonance error monitoring unit, hereinafter referred to as a short circuit monitoring unit for short.

As a third module, which is assigned to the short circuit monitoring unit in the broadest sense, a resonance trend detection unit is optionally provided which operates with even further reduced reaction speed compared to the resonance error monitoring unit, but itself incorporates long-term, insidious operating parameter drift into the monitoring and if necessary initiates shutdown of the resonant converter.

In a preferred embodiment, the primary-side open circuit detection monitoring unit provided in each case in addition to the short circuit monitoring unit containing one or more modules incorporates a cascaded sample-and-hold circuit.

The sample-and-hold circuit is preferably connected on the output side to an input of a controller configured to control the resonant converter. In an advantageous embodiment, the same controller also controls the frequency generator which forms part of the control circuit and keeps the resonant converter operating at above resonance during the charging process. In the event of a detected open circuit condition occurring on the secondary side, detection takes place solely on the primary side and therefore in an electrically isolated manner from the components directly affected by the open circuit condition. The controller receives from the sample-and-hold circuit an analog input signal and therefore a measured value for a relationship between open circuit operation and operation under load. Via the frequency generator or more specifically an H-bridge control signal, the controller ensures shutdown of the resonant converter. For this purpose the controller has its own internal switching threshold which is defined e.g. in software. In this way a first, controller-dependent chain of effects for open circuit monitoring is implemented.

Optionally connected downstream of the sample-and-hold circuit are a comparator and a flip-flop, in particular an RS flip-flop, wherein a reference input of the comparator is connected to the controller via a filter connected downstream of a PWM (pulse width modulation) unit, whereas the second comparator input is connected to the output of the cascaded sample-and-hold circuit. Inputs of the flip-flop are here connected, on the one hand, to the comparator output and, on the other, to a reset interface of the controller provided for controlling the resonant converter.

An output of the flip-flop is preferably directly connected to an input of a gate driver provided for feeding power into the primary winding of the transformer, the gate driver being a component of the resonant converter. This makes it possible for resonant converter shutdown to be initiated independently of the controller by means of the flip-flop. To differentiate it from the above-mentioned controller-dependent chain of effects, in the case of such a shutdown via the flip-flop the term controller-independent chain of effects is used. Once it has been parameterized by the controller, the open circuit detection unit incorporating the flip-flop automatically monitors the open circuit point, operating asynchronously to the controller. In other words: the different chains of effect of open circuit detection differ in respect of their timing. In this context, asynchronicity relates to an operating frequency of a power electronic bridge circuit of the resonant converter in relation to the operating frequency of the controller. Asynchronous initiation of open circuit detection by the flip-flop would also be provided even in the event of any malfunction of the controller.

In an advantageous embodiment, another output of the flip-flop is directly connected to the controller provided for controlling the resonant converter. This flip-flop feedback to the controller allows functional checking of components of the open circuit detection unit.

Even with this additional function, the entire circuit configuration is characterized by design simplicity, in particular the elimination of complex sensing devices for detecting open circuit operation.

The method for operating a resonant converter which feeds energy into a primary winding of a transformer, in particular of a charging station for wirelessly charging an electrically powered vehicle, advantageously contains the following features: the resonant converter is operated in the above-resonance range and is preferably monitored in respect of resonance point and current in order to prevent below-resonance operation, the resonant converter is controlled by a controller, a secondary-side open circuit condition of the transformer is monitored on the primary side asynchronously with respect to the controller. The resonant converter is shut down independently of the controller if an open circuit condition is detected.

According to an advantageous development of the method, additional open circuit detection involving the controller takes place. Here open circuit detection using the controller preferably reacts more slowly than controller-independent open circuit detection. The advantage of comparatively sluggishly responding open circuit detection by the controller is that, even if the load in the battery charging system changes slowly and continuously, provided this could result in the overloading of components, in particular of power electronic elements, the resonant converter is shut down, i.e. its operating mode is changed.

An open circuit condition is preferably detected using at least one settable switching threshold. In an advantageous embodiment, if a plurality of shutdown mechanisms which become effective in the event of open circuit or other impermissible load changes are present, different open circuit detection parameters can be set independently of one another, wherein the term open circuit detection is to be understood in a broad sense and also includes slow load changes.

For fast-acting open circuit detection, a current measurement is preferably acquired a plurality of times during each complete period of a primary-side current signal and kept stable for at least a sub-period until acquisition of the next current measurement. For example, current measurements are taken twice during each complete period of the primary-side current signal, in particular at 90° and 270°. The advantage of measuring at 90° and 270° is that, at these points in the cycle, the entire primary current including magnetizing current is at its maximum or close to maximum during normal charging, whereas at the same points in the cycle in an open circuit situation the magnetizing current is at the zero crossing in each case and no additional current is present, so that altogether the open circuit is readily detectable.

Each current measurement, i.e. in particular the current measured at both 90° and 270°, is converted into a preferably analog output signal which, with particular preference, is held constant at least until the next current measurement is acquired. Each such output signal is therefore preferably present unchanged through at least 180°.

Other features which are considered as characteristic for the invention are set forth in the appended claims.

Although the invention is illustrated and described herein as embodied in a circuit configuration having a resonant converter, and method for operating a resonant converter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Corresponding parts or parameters are indicated by the same reference characters in all the figures. Referring now to the figures of the drawings in detail and first, particularly to FIG. 1 thereof, there is shown a battery charging system 1 denoted as an entity by reference character 1 and illustrated in the form of a block diagram. The battery charging station 1 contains a primary side 2 which is fixed and a secondary side 3 which is on-board an electric vehicle (not shown in greater detail) having a battery 4 to be charged.

Figure 1:
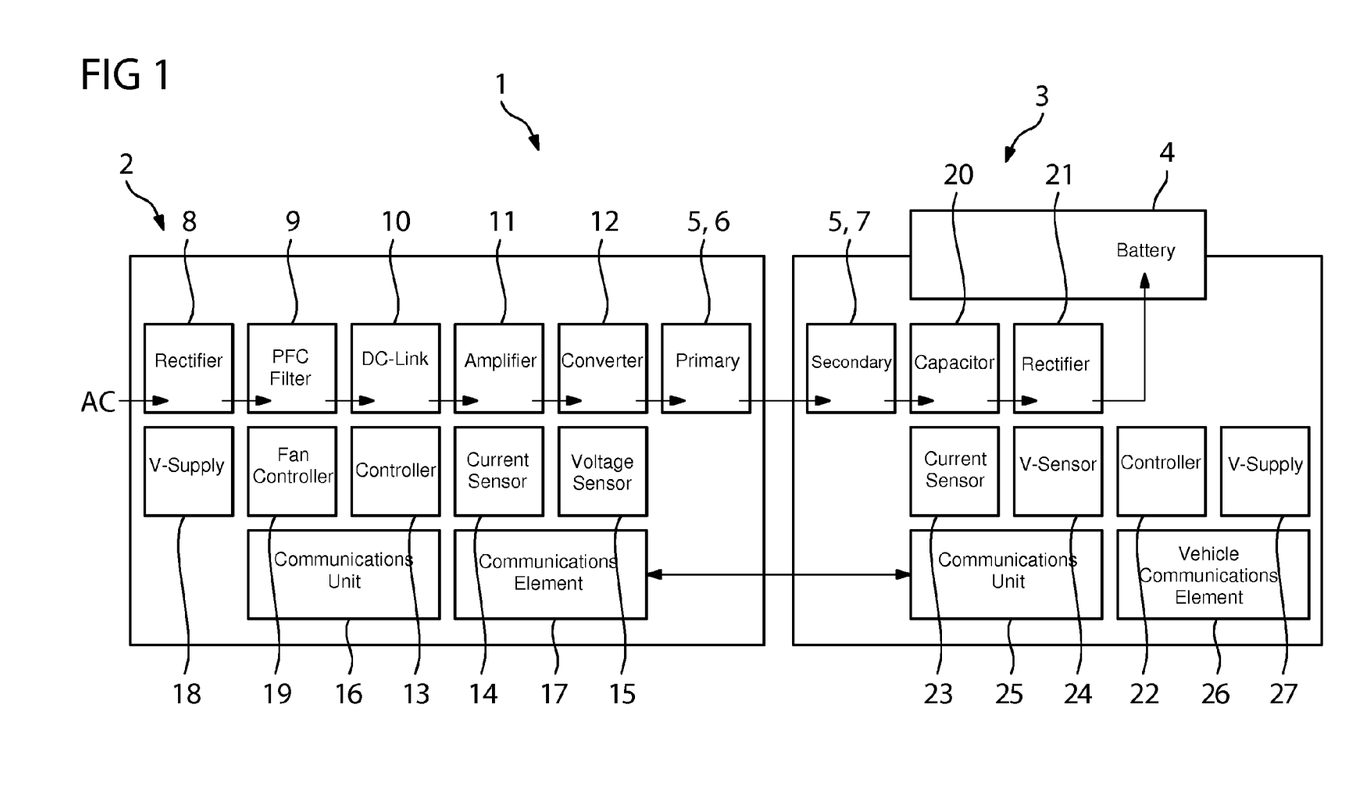
FIG. 1 is a block diagram of a battery charging system for wirelessly charging a battery, containing a resonant converter according to the invention.

An interface between the primary side 2 and the secondary side 3 is constituted by a transformer 5 having a primary winding 6, i.e. primary coil, and a secondary winding 7.

The primary side 2 of the battery charging system 1 additionally contains a rectifier 8, a power factor correction (PFC) filter 9, a DC-link 10, and an amplifier 11 which supplies electrical power to a resonant converter 12 which employs a resonant circuit whose resonant frequency is dependent, among other things, on the inductance and the (compensation) capacitance of the primary winding 6 of the transformer 5.

The resonant converter 12 operates at frequencies above 50 kHz and is controlled using a controller 13 that is likewise located on the primary side 2 of the battery charging system 1. The controller 13 plays an important role in detecting an open circuit situation, i.e. the sudden unintended disconnection of the battery 4, as will be explained in greater detail below. Additionally present on the primary side 2 are a primary-side current sensor 14 and a primary-side voltage sensor 15. A communications unit 16 is provided for data exchange, e.g. with a higher-order controller. An additional communications element 17 can be used on the secondary side 3 for calibration and checking purposes in particular in conjunction with a corresponding communications unit 25. Communication takes place wirelessly, e.g. via WLAN. Other components on the primary side 2 are a voltage supply 18 and a fan control 19.

Connected downstream of the secondary winding 7 on the secondary side 3 are a capacitor 20 and a rectifier 21. Similarly to the primary side 2, the secondary side 3 also has a controller 22, a current sensor 23, and a voltage sensor 24. Analogously to the primary communications element 17 there is also provided on the secondary side 3 the already mentioned communications element 25 in particular for calibration and checking purposes. Instead of a communications unit 16, a vehicle communications element 26 installed in the vehicle is present on the secondary side 3. Instead of a voltage supply 18 delivering an AC voltage as provided on the primary side 2, the secondary side 3 has only an auxiliary voltage supply 27.

Figure 2:
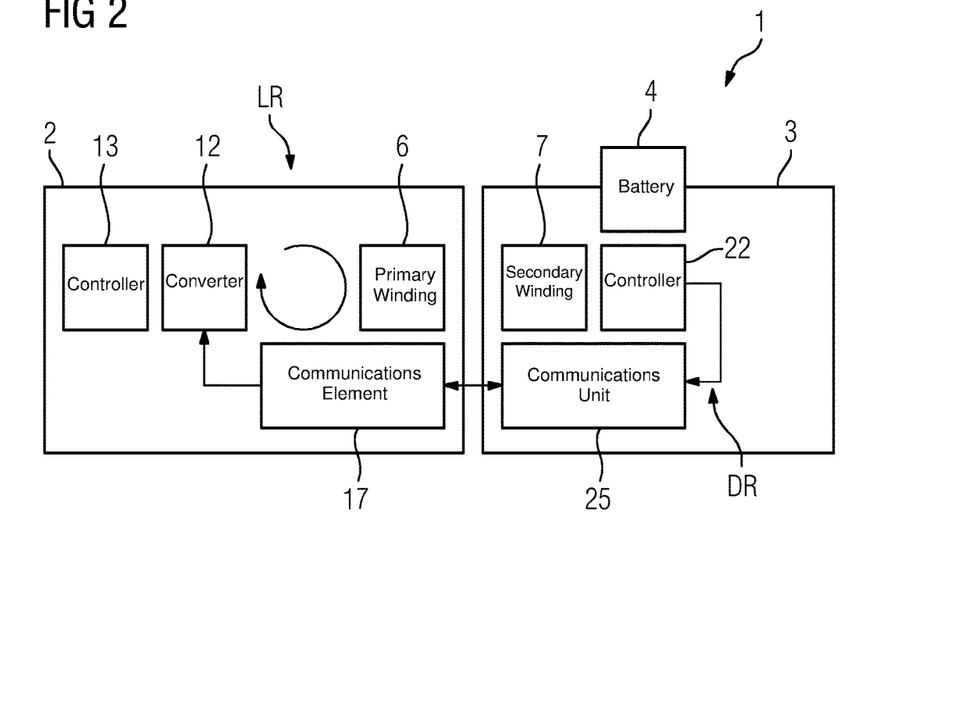
FIG. 2 is a block diagram of the battery charging system according to FIG. 1 with a control circuit illustrated.

The main features of the closed-loop control of the battery charging system 1 are illustrated in FIG. 2 which shows a simplified representation of the configuration according to FIG. 1. A primary-side power control circuit RL can be seen. Current control is not provided on the secondary side 3. Data feedback DR from the secondary side 3 to the primary side 2 relates to calibration data which is acquired on the secondary side 3 for power calibration of the battery charging system 1. Because of the relatively constant battery voltage, this indirectly enables and preferably also implements battery current control.

Figure 3:
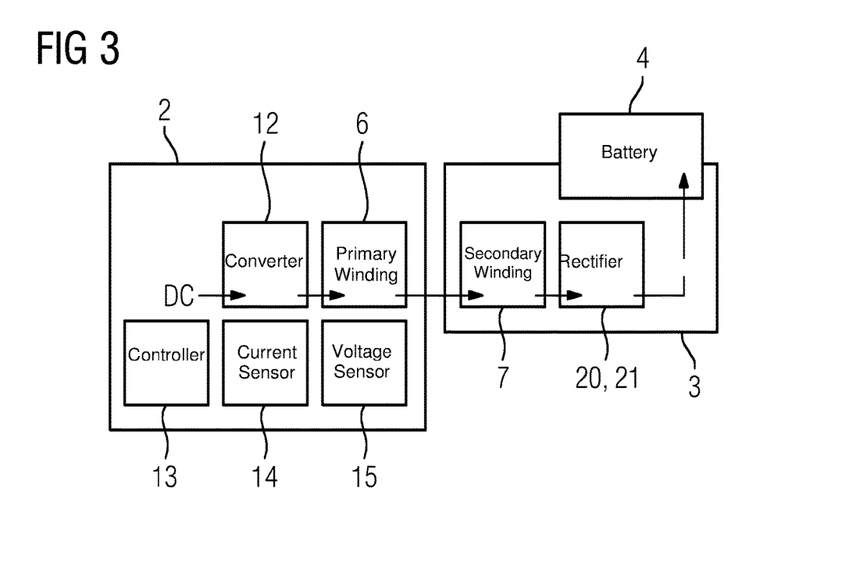
FIG. 3 is a block diagram of the battery charging system according to FIG. 1, wherein here the open circuit situation to be detected is illustrated.

In FIG. 3 the battery charging system 1 is shown simplified still further compared to FIG. 1 and FIG. 2, particularly with regard to the secondary side 3, wherein the capacitor 20 and the secondary-side rectifier 21 are in this case visualized as a single component. A possible open circuit situation is shown in FIG. 3 by a break line between the rectifier 21 and the battery 4.

Figure 4:
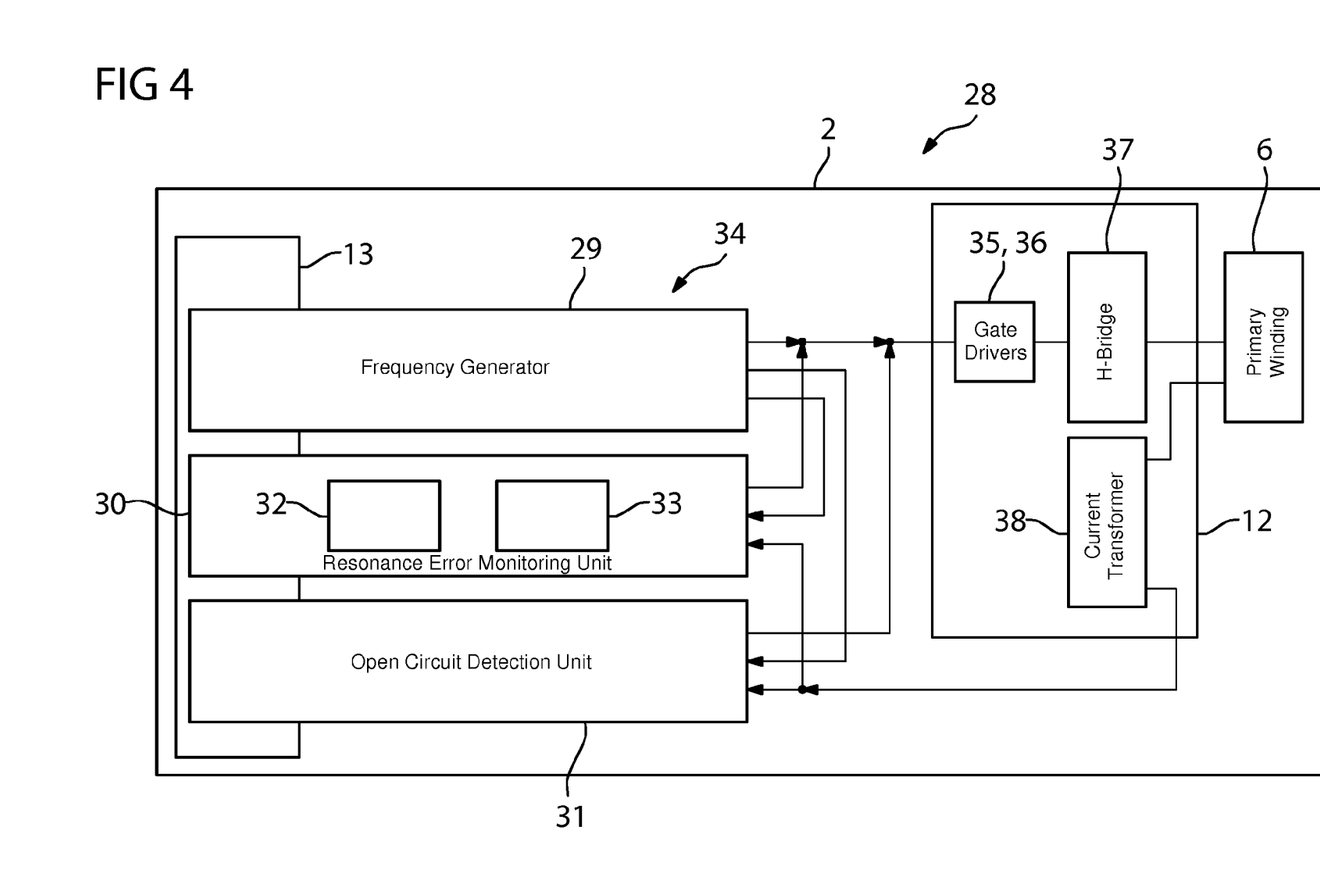
FIG. 4 is a block diagram of a circuit configuration provided within the battery charging system according to FIG. 1, containing the resonant converter and a control circuit for the controlling thereof, including the protection and monitoring mechanisms.

FIG. 4 shows in greater detail a section of the configuration according to FIG. 1, namely a circuit configuration 28 containing the primary controller 13 and the resonant converter 12. The controller 13, together with the three modules 29, 30, 31 which will be described in greater detail below, constitutes a control circuit 34 for controlling the resonant converter 12. The resonant converter 12 contains a plurality of power electronic components, namely gate drivers 35, 36, gates of an H-bridge 37 and current transformer 38.

The individual modules 29, 30, 31 which interact with the controller 13 are a frequency generator 29, a short circuit and resonance error monitoring unit 30, and an open circuit detection unit 31. The short circuit and resonance error monitoring unit 30 will hereinafter be referred to as a short circuit monitoring unit 30 for short.

The frequency generator 29 (dual phase frequency generator) is required for operating the resonant converter 12 and contains a frequency-controllable digital or analog generator controlled from a controller 13, the generator being configured as a voltage controlled oscillator (VCO) or as a digital frequency divider. The frequency of the frequency generator 29 is open-loop and closed-loop controllable in sufficiently fine intervals in order to be able to reliably prevent below-resonance operation of the resonant converter 12 in the event of a frequency change.

The short circuit monitoring unit 30 is used for monitoring the current flowing through the resonant converter 12 for a short circuit. The short circuit monitoring unit 30 is implemented as a module which reacts quickly to a short circuit and incorporates two other, relatively slow-acting modules, namely a resonance error monitoring unit 32 and a resonance trend detection unit 33, so that altogether threefold protection against short circuit or medium-/long-term current changes potentially damaging to components of the battery charging system 1 is provided.

The open circuit detection unit 31 will now be explained in greater detail with reference to FIG. 5. Whereas the frequency generator 29 which incorporates a clock generator is connected (drawn to smaller scale in FIG. 5 compared to FIG. 4) to a clock terminal 39 of the controller 13, the short circuit monitoring unit 30 and its individual modules 32, 33 are not shown in FIG. 5.

Figure 5:
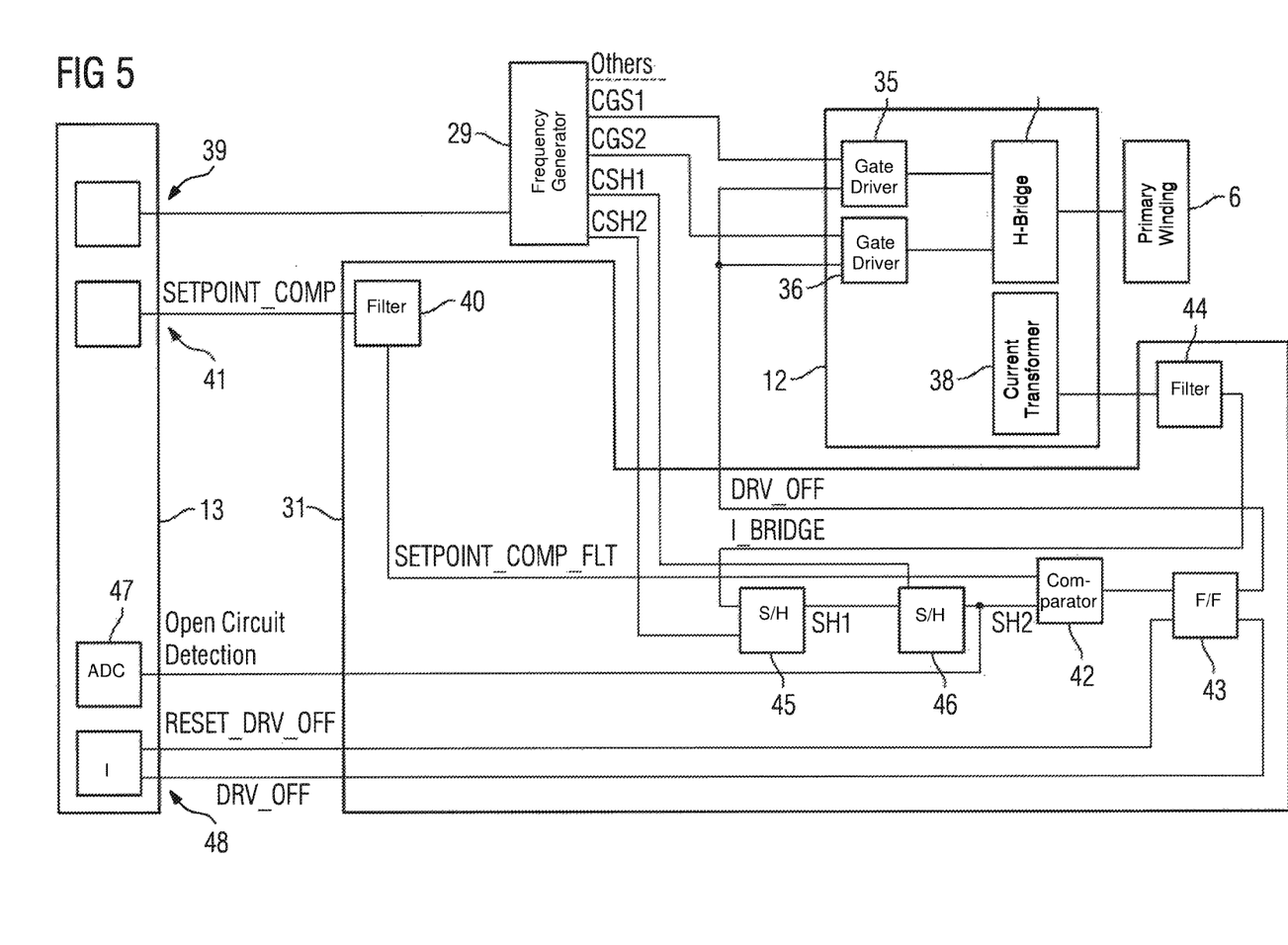
FIG. 5 is a block diagram showing the circuit configuration according to FIG. 4 wherein a module, namely an open circuit detection unit, is illustrated in greater detail than in FIG. 4.

Visible as features of the open circuit detection unit 31 in FIG. 5 are a filter 40, connected to a PWM terminal 41 of the controller 13, a comparator 42, an RS flip-flop 43, and another filter 44 which is electrically connected to the current transformer 38. As can be seen from FIG. 5, the open circuit detection unit 31 also has a cascaded sample & hold circuit 45, 46.

On the input side, the sample & hold circuit 45, 46 is connected to the filter 44 and to the frequency generator 29. Available at the output of the cascaded sample & hold circuit 45, 46 is a signal SH2 which is applied to the input of an analog-digital converter (ADC) 47 of the controller 13. Using the signal digitized by the analog-digital converter 47, the controller 13 performs an evaluation which detects any open circuit situation of the battery charging system 1, as will be explained in greater detail with reference to FIGS. 6 and 7. If an open circuit is detected, the controller 13 stops the injection of energy into the primary winding 6 of the transformer 5 by a corresponding signal fed out to the frequency generator 29 or more precisely to the gates of the H-bridge 37. This signal flow constitutes a first, controller-dependent chain of effects for open circuit detection.

Another, controller-independent chain of effects for shut-down of the battery charging system 1 in an open circuit situation is created by feeding the output signal SH2 of the sample & hold circuit 45, 46 to the RS flip-flop 43 via the comparator 42. Here a filtered PWM reference signal SET-POINT_COMP_FLT which is obtained by the filter 40 from an unfiltered reference signal SETPOINT_COMP supplied by the controller 13 is applied to the reference input of the comparator 42. Shutdown of the resonant converter in the event of an open circuit is affected in this case by a signal fed directly from the RS flip-flop 43 to the resonant converter 12 and comes into effect in particular if the first chain of effects including the controller 13 fails to operate or does not operate quickly enough.

In addition, an output of the RS flip-flop 43 is connected to an interface 48 (GPIO=general purpose input/output) of the controller 13. This feedback from the RS flip-flop 43 to the controller 13 provides a supplementary checking function. The interface 48 can also be used to reset the RS flip-flop 43 and is therefore termed the reset interface.

The signal SH2 present at the output of the sample & hold circuit 45, 46 is determined at defined instants during the clock cycle. In order to be able to differentiate in the best possible manner between open circuit operation of the transformer 5, during which only a magnetizing current appears, and operation under load in which a load current additionally flows, current measurement which supplies the signal SH2 is carried out at 90° and 270°. By contrast, taking a measurement at the end of the clock cycle of the frequency generator 29, i.e. at 360°, would not produce a signal that could be used to distinguish between operation under load and an open circuit condition.

For further explanation of the measurements carried out as part of open circuit detection, reference will now be made to FIGS. 6 and 7.

Figure 6:
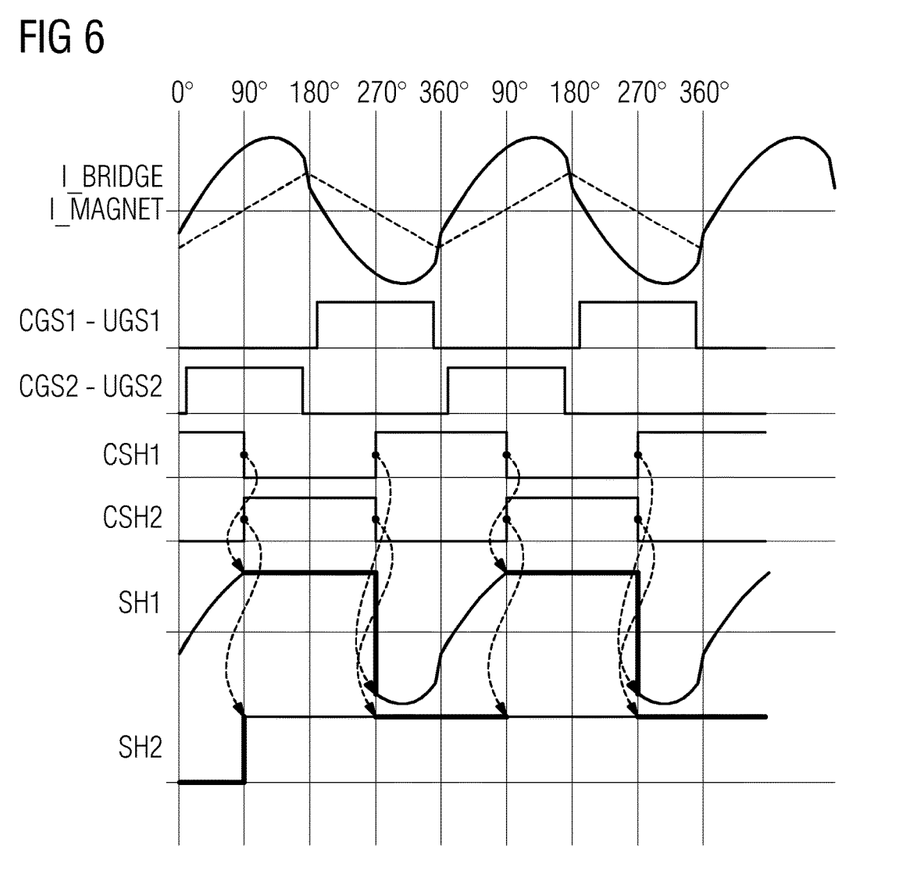
FIG. 6 is a graph showing voltage, current and signal waveforms during normal operation of the battery charging system according to FIG. 1.

FIG. 6 relates to normal operation, i.e. charging mode, of the resonant converter 12. The total current I_BRIDGE flowing in the resonant converter 12 includes a magnetizing current I_MAGNET which cannot be measured separately and is shown in the form of a dashed line in the top diagram in FIG. 6. The waveforms of CGS1, CGS2, CSH1 and CSH2 shown below the current waveform in FIG. 6 relate to output signals of the frequency generator 29. Also shown in FIG. 6 is the waveform of an intermediate signal SH1 transmitted within the sample & hold circuit 45, 46, and the waveform of the already mentioned output signal SH2.

The intermediate signal SH1 is determined at clock instants 90° and 270° at which the total current I_BRIDGE is very significantly non-zero in each case, namely close to its absolute maximum or minimum as the case may be. Up to 90°, the waveform of SH1 follows the waveform of the total current I_BRIDGE and is frozen at this instant. At clock instant 270°, the intermediate signal SH1 held constant until this instant is replaced by the present, negative value of I_BRIDGE which is in turn held constant. Initiated by the clock-controlled measurement, as shown in FIG. 6 by curved dashed lines between different parts of the diagram, the intermediate signal SH1 therefore continuously swings between a positive and a negative value after each half-cycle. As long as the intermediate signal SH1, as in the case here, is non-zero, the output signal SH2 is maintained in the positive region, as can be seen from the bottom section of FIG. 6.

This positive value of the output signal SH2 is made continuously available to the comparator 42, as explained with reference to FIG. 5. The circuit shown in FIG. 5 can be incorporated, for example, in a CPLD (complex programmable logic device). At least one switching threshold of the open circuit detection unit 31 can be parameterizable here, thereby enabling shutdown of the resonant converter 12 to be initiated.

Figure 7:
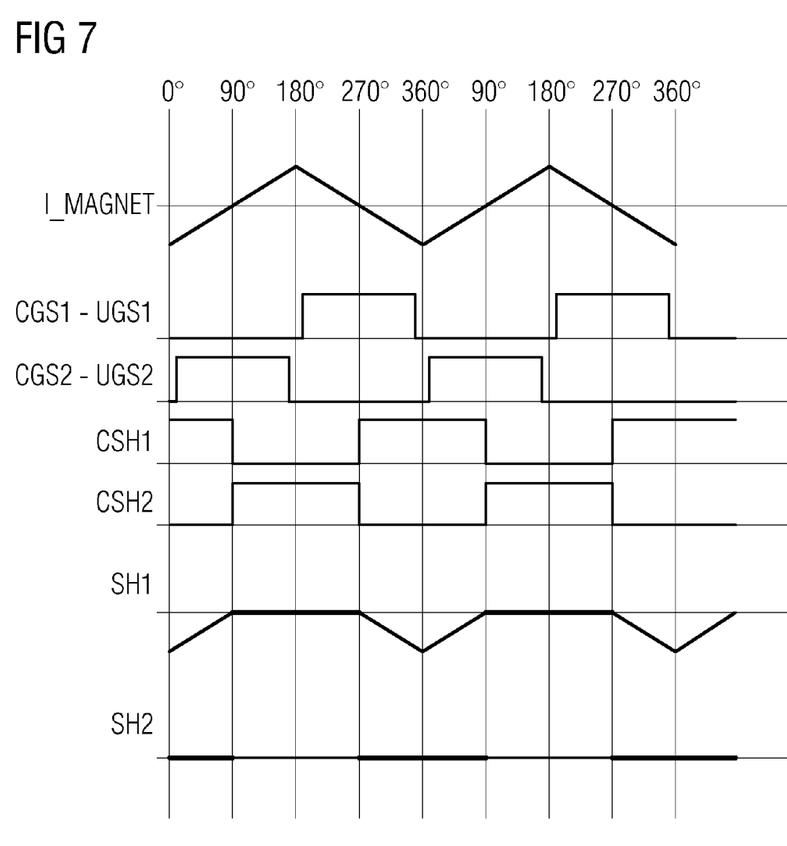
FIG. 7 is a graph showing an open circuit operation of the battery charging system according to FIG. 1 in a representation analogous to FIG. 6.

FIG. 7, which in contrast to FIG. 6 illustrates the open circuit case, clearly shows the elimination of the total current I_BRIDGE over and above the magnetizing current I_MAGNET and the therefrom resulting effect on the intermediate signal SH1 and the output signal SH2. Whereas the intermediate signal SH1 attains the positive region at no point in the cycle, the output signal SH2 remains constantly at zero. The difference with respect to normal charging (FIG. 6) detectable by the open circuit detection unit 31 is therefore extremely significant. During startup of the resonant converter 1, the output signal SH2 is not evaluated by the controller 13 until a stable operating state has been attained, or more precisely, as a requirement to that end, the switching threshold of a comparator of the controller 13 is set as a function of the input signal provided to the controller 13 to define a switching criterion.

Altogether the resonant converter 12 provides stable, diversely functioning protection mechanisms against impermissible operating states, both in respect of excessively high currents, in particular short circuit currents, and an open circuit situation on the secondary side of the transformer 5, without measuring test signals on the secondary side or having recourse to such signals for this purpose.

The invention claimed is:

1. A circuit configuration, comprising:
a primary winding of a transformer;
a resonant converter feeding energy into said primary winding of said transformer;
a control circuit for controlling said resonant converter and having a plurality of modules, said plurality of modules including:
a frequency generator controllable with a variable frequency;
a short circuit monitoring unit for protecting components of said resonant converter; and
an open circuit detection unit, said open circuit detection unit shutting down said resonant converter if a secondary side interacting with said primary winding of said transformer is open circuit, without feedback from the secondary side, said open circuit detection unit having a cascaded sample-and-hold circuit, said open circuit detection unit having a comparator and a flip-flop connected downstream of said cascaded sample-and-hold circuit;
a controller having an input and provided for controlling said resonant converter, said cascaded sample-and-hold circuit having an output side connected to said input of said controller; and
a gate driver having an input and provided for injecting power into said primary winding of said transformer, said flip-flop having an output directly connected to said input of said gate driver;
said cascaded sample-and-hold circuit having an output providing an analog input signal to an input of said control circuit for controlling said resonant converter, said analog input signal representing a measured value for a relationship between open circuit operation and operation under load; and
said gate driver being a component of said resonant converter.

2. The circuit configuration according to claim 1, wherein said flip-flop is an RS flip-flop.

3. The circuit configuration according to claim 1, wherein said flip-flop has a further output directly connected to said controller provided for controlling said resonant converter.

4. The circuit configuration according to claim 1, wherein:
said controller has an interface; and
said flip-flop has an input connected to said interface of said controller provided for controlling said resonant converter.

5. The circuit configuration according to claim 1, wherein said open circuit detection unit is configured to operate asynchronously with respect to said controller.

6. The circuit configuration according to claim 1, wherein said short circuit monitoring unit has a resonance error monitoring unit and a resonance trend detection unit that reacts slower than said resonance error monitoring unit.

7. The circuit configuration according to claim 1, wherein the circuit configuration is used in a wireless battery charging system of an electric vehicle.

8. An operational method, which comprises the steps of:
providing a circuit configuration containing a primary winding of a transformer, a resonant converter feeding energy into the primary winding of the transformer, and a control circuit for controlling the resonant converter and having a plurality of modules, the plurality of modules including a frequency generator controllable with a variable frequency, a short circuit monitoring unit for protecting components of the resonant converter, and an open circuit detection unit, the open circuit detection unit shutting down the resonant converter if a secondary side interacting with the primary winding of the transformer is open circuit, without feedback from the secondary side; and
using the circuit configuration in a wireless battery charging system of an electric vehicle;
wherein the open circuit detection unit detects an open circuit by:
acquiring a plurality of current measurements during each complete period of a primary current signal, and
generating a signal from the current measurements which is maintained stable at least for a sub-period of a complete period until acquisition of a next current measurement.

9. The method according to claim 8, which further comprises:
disposing the primary winding of the transformer in a fixed charging station; and
disposing an associated secondary winding in a vehicle having a battery under charge.

10. A method for operating a resonant converter which feeds energy into a primary winding of a transformer, which comprises the steps of:
operating the resonant converter in an above-resonance region;
controlling the resonant converter by means of a controller; and
monitoring a secondary-side open circuit condition of the transformer on the primary side asynchronously with respect to the controller, wherein controller-independent shutdown of the resonant converter takes place if an open circuit condition is detected;
wherein for the open circuit condition is detected by:
acquiring a plurality of current measurements during each complete period of a primary current signal; and
generating a signal from the current measurements which is maintained stable at least for a sub-period of a complete period until acquisition of a next current measurement.

11. The method according to claim 10, wherein open circuit detection takes place using the controller.

12. The method according to claim 11, wherein the open circuit detection using the controller reacts slower than controller-independent open circuit detection.

13. The method according to claim 11, wherein the open circuit detection takes place using at least one settable switching threshold.

14. The method according to claim 10, which further comprises:
acquiring the current measurements twice during each complete period of the primary current signal; and
generating an intermediate signal and an output signal from the current measurements.

15. The method according to claim 14, which further comprises maintaining the output signal generated from a current measurement constant at least until a next current measurement is acquired.

16. The method according to claim 14, which further comprises acquiring the current measurements at 90° and 270°.

* * * * *